(12) United States Patent
Hasegawa et al.

(10) Patent No.: US 11,689,320 B2
(45) Date of Patent: Jun. 27, 2023

(54) RECEPTION DEVICE, COMMUNICATION SYSTEM, AND RECORDING MEDIUM

(71) Applicant: OLYMPUS CORPORATION, Hachioji (JP)

(72) Inventors: Yasuhiro Hasegawa, Hanno (JP); Kazuyuki Shibuya, Sagamihara (JP); Kiyoshi Toyoda, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/851,419

(22) Filed: Jun. 28, 2022

(65) Prior Publication Data
US 2022/0329356 A1    Oct. 13, 2022

Related U.S. Application Data

(63) Continuation of application No. PCT/JP2020/006781, filed on Feb. 20, 2020.

(51) Int. Cl.
| | | |
|---|---|---|
| *H04L 1/00* | (2006.01) | |
| *H04L 1/08* | (2006.01) | |
| *H04L 1/1607* | (2023.01) | |
| *H04W 28/04* | (2009.01) | |

(52) U.S. Cl.
CPC .............. *H04L 1/08* (2013.01); *H04L 1/1642* (2013.01); *H04W 28/04* (2013.01)

(58) Field of Classification Search
None
See application file for complete search history.

(56) References Cited

U.S. PATENT DOCUMENTS

| | | | |
|---|---|---|---|
| 2017/0230149 A1* | 8/2017 | Wang | H04L 1/1614 |
| 2019/0146883 A1 | 5/2019 | Miyazaki et al. | |
| 2019/0158249 A1* | 5/2019 | Harada | H04W 72/23 |
| 2019/0281504 A1* | 9/2019 | Su | H04W 52/28 |
| 2019/0281598 A1* | 9/2019 | Almalfouh | H04W 28/18 |

FOREIGN PATENT DOCUMENTS

| | | |
|---|---|---|
| JP | 2006-54721 A | 2/2006 |
| JP | 2015-95705 A | 5/2015 |
| JP | 2017-208707 A | 11/2017 |

OTHER PUBLICATIONS

International Search Report dated Apr. 28, 2020, issued in counterpart International application No. PCT/JP2020/006781, with English translation. (4 pages).

* cited by examiner

*Primary Examiner* — Mujtaba M Chaudry
(74) *Attorney, Agent, or Firm* — WHDA, LLP (57) ABSTRACT

A reception device includes a wireless communicator, a memory, and one or more processors. The processors identify a retransmission candidate of image data on the basis of a sequence number recorded on the memory. The processors calculate an upper limit retransmission number on the basis of a physical rate and a communication rate recorded on the memory. The processors set an allowable retransmission number that is less than or equal to the upper limit retransmission number. The processors transmit a retransmission request for requesting retransmission of as many of the retransmission candidates as the allowable retransmission number to the transmission device in a blanking period by using the wireless communicator when the number of the retransmission candidates identified through the identification processing exceeds the allowable retransmission number.

6 Claims, 8 Drawing Sheets

RECEPTION DEVICE, COMMUNICATION SYSTEM, AND RECORDING MEDIUM

The present application is a continuation application based on International Patent Application No. PCT/JP2020/006781 filed on Feb. 20, 2020, the content of which is incorporated herein by reference.

BACKGROUND OF THE INVENTION

Field of the Invention

The present invention relates to a reception device, a communication system, and a recording medium.

Description of Related Art

Diagnosis and inspection using an endoscope are performed in medical and industrial fields. An endoscope system includes a scope and a processor device. An imaging device is built in a distal end of an insertion unit included in the scope. The processor device performs signal processing on an imaging signal acquired by the imaging device. A user can observe an image (endoscope image) displayed on a monitor and can save the image. The scope and the processor device are usually connected to each other by a signal cable.

On the other hand, a wireless endoscope system that wirelessly connects a scope and a processor device to each other has been devised. In such a wireless endoscope system, restrictions on operations because of a cable are alleviated, and the operability is improved. However, there is a case in which the wireless endoscope system is affected by interference or the like and cannot perform wireless communication. Therefore, there is a possibility that a blackout of an image to be displayed, a disturbance of the image, or the like occurs or data are lost in an image to be saved. The influence caused by the above needs to be reduced.

A transmission device of the wireless endoscope system transmits a wireless packet having a header region including a sequence number. A reception device of the wireless endoscope system determines whether loss of data (frame) has occurred by checking the sequence number of the received wireless packet. A technique of stopping updates of images when loss of data occurs is used. The technique uses a frame that is normally received before loss of data is detected for display. In addition, a system that distributes compressed video data generated by compressing video information in real time has been proposed. For example, in a system disclosed in Japanese Unexamined Patent Application, First Publication No. 2015-095705, compressed video data recorded on a back-up memory are transmitted again as data for recording in accordance with a retransmission request received in a predetermined cycle from a reception device.

SUMMARY OF THE INVENTION

According to a first aspect of the present invention, a reception device includes a wireless communicator, a memory, and one or more processors. The wireless communicator is configured to receive image data that are transmitted by a transmission device and include a sequence number. A physical rate of the wireless communicator and a communication rate of the image data are recorded on the memory. The one or more processors are configured to execute recording processing of recording the sequence number of the image data received by the wireless communicator on the memory. The one or more processors are configured to execute image output processing of outputting the image data received by the wireless communicator to a monitor. The one or more processors are configured to execute identification processing of identifying a retransmission candidate on the basis of the sequence number recorded on the memory. The retransmission candidate indicates image data that have been transmitted by the transmission device and have not been received by the wireless communicator. The one or more processors are configured to execute calculation processing of calculating an upper limit retransmission number on the basis of the physical rate and the communication rate recorded on the memory. The upper limit retransmission number indicates an upper limit of the number of pieces of image data of which retransmission has been requested. The one or more processors are configured to execute setting processing of setting an allowable retransmission number that is less than or equal to the upper limit retransmission number. The one or more processors are configured to execute retransmission request processing of transmitting a retransmission request for requesting retransmission of as many of the retransmission candidates as the allowable retransmission number to the transmission device by using the wireless communicator when the number of the retransmission candidates identified through the identification processing exceeds the allowable retransmission number. The one or more processors are configured to execute the retransmission request processing in a blanking period. The blanking period is a period from a first timing to a second timing. The first timing comes after transmission of N-th frame data including one or more pieces of image data for the first time is completed. The second timing comes after the first timing and before transmission of (N+1)-th frame data including one or more pieces of image data for the first time is started. N is an integer of one or more. The one or more processors are configured to execute the retransmission request processing in the blanking period after transmission of K-th frame data including one or more pieces of image data for the first time is completed so as to transmit the retransmission request of M-th frame data including one or more pieces of image data to the transmission device. M is an integer of one or more and K is an integer that is greater than or equal to (M+1).

According to a second aspect of the present invention, in the first aspect, the one or more processors may be configured to further execute checking processing of checking a retransmission success number. The retransmission success number indicates the number of the retransmission candidates that are successfully received by the wireless communicator after the retransmission request is transmitted. The one or more processors may be configured to set the retransmission success number as the allowable retransmission number in the setting processing.

According to a third aspect of the present invention, in the second aspect, the one or more processors may be configured to increase the allowable retransmission number by executing the setting processing again when the allowable retransmission number set through the setting processing matches the retransmission success number checked through the checking processing.

According to a fourth aspect of the present invention, in the first aspect, the one or more processors may be configured to further execute checking processing of checking a retransmission success number. The retransmission success number indicates the number of the retransmission candidates that are successfully received by the wireless communicator after the retransmission request is transmitted. The one or more processors may be configured to increase the allowable retransmission number by executing the setting processing again when the allowable retransmission number set through the setting processing matches the retransmission success number checked through the checking processing.

According to a fifth aspect of the present invention, a communication system includes a transmission device and a reception device. The transmission device includes a first memory, a first wireless communicator, and one or more first processors. Image data are temporarily recorded on the first memory. The first wireless communicator is configured to transmit the image data including a sequence number to the reception device and receive a retransmission request for requesting retransmission of the image data from the reception device. The one or more first processors are configured to execute retransmission processing of transmitting the image data requested by using the retransmission request to the reception device by using the first wireless communicator when the first wireless communicator receives the retransmission request from the reception device. The reception device includes a second wireless communicator, a second memory, and one or more second processors. The second wireless communicator is configured to receive the image data from the transmission device. A physical rate of the second wireless communicator and a communication rate of the image data are recorded on the second memory. The one or more second processors are configured to execute recording processing of recording the sequence number of the image data received by the second wireless communicator on the second memory. The one or more second processors are configured to execute image output processing of outputting the image data received by the second wireless communicator to a monitor. The one or more second processors are configured to execute identification processing of identifying a retransmission candidate on the basis of the sequence number recorded on the second memory. The retransmission candidate indicates image data that have been transmitted by the transmission device and have not been received by the second wireless communicator. The one or more second processors are configured to execute calculation processing of calculating an upper limit retransmission number on the basis of the physical rate and the communication rate recorded on the second memory. The upper limit retransmission number indicates an upper limit of the number of pieces of image data of which retransmission has been requested. The one or more second processors are configured to execute setting processing of setting an allowable retransmission number that is less than or equal to the upper limit retransmission number. The one or more second processors are configured to execute retransmission request processing of transmitting a retransmission request for requesting retransmission of as many of the retransmission candidates as the allowable retransmission number to the transmission device by using the second wireless communicator when the number of the retransmission candidates identified through the identification processing exceeds the allowable retransmission number. The one or more second processors are configured to execute the retransmission request processing in a blanking period. The blanking period is a period from a first timing to a second timing. The first timing comes after transmission of N-th frame data including one or more pieces of image data for the first time is completed. The second timing comes after the first timing and before transmission of (N+1)-th frame data including one or more pieces of image data for the first time is started. N is an integer of one or more. The one or more second processors are configured to execute the retransmission request processing in the blanking period after transmission of K-th frame data including one or more pieces of image data for the first time is completed so as to transmit the retransmission request of M-th frame data including one or more pieces of image data to the transmission device. M is an integer of one or more and K is an integer that is greater than or equal to (M+1).

According to a sixth aspect of the present invention, a non-transitory computer-readable recording medium stores a program causing one or more processors of a reception device to execute processing. The reception device includes a wireless communicator, a memory, and the one or more processors. The wireless communicator is configured to receive image data that are transmitted by a transmission device and include a sequence number. A physical rate of the wireless communicator and a communication rate of the image data are recorded on the memory.

The one or more processors execute recording processing of recording the sequence number of the image data received by the wireless communicator on the memory. The one or more processors execute image output processing of outputting the image data received by the wireless communicator to a monitor. The one or more processors execute identification processing of identifying a retransmission candidate on the basis of the sequence number recorded on the memory. The retransmission candidate indicates image data that have been transmitted by the transmission device and have not been received by the wireless communicator. The one or more processors execute calculation processing of calculating an upper limit retransmission number on the basis of the physical rate and the communication rate recorded on the memory. The upper limit retransmission number indicates an upper limit of the number of pieces of image data of which retransmission has been requested. The one or more processors execute setting processing of setting an allowable retransmission number that is less than or equal to the upper limit retransmission number. The one or more processors execute retransmission request processing of transmitting a retransmission request for requesting retransmission of as many of the retransmission candidates as the allowable retransmission number to the transmission device by using the wireless communicator when the number of the retransmission candidates identified through the identification processing exceeds the allowable retransmission number. The one or more processors execute the retransmission request processing in a blanking period. The blanking period is a period from a first timing to a second timing. The first timing comes after transmission of N-th frame data including one or more pieces of image data for the first time is completed. The second timing comes after the first timing and before transmission of (N+1)-th frame data including one or more pieces of image data for the first time is started. N is an integer of one or more. The one or more processors execute the retransmission request processing in the blanking period after transmission of K-th frame data including one or more pieces of image data for the first time is completed so as to transmit the retransmission request of M-th frame data including one or more pieces of image data to the transmission device. M is an integer of one or more and K is an integer that is greater than or equal to (M+1).

DETAILED DESCRIPTION OF THE INVENTION

Hereinafter, embodiments of the present invention will be described with reference to the drawings.

First Embodiment

Figure 1:
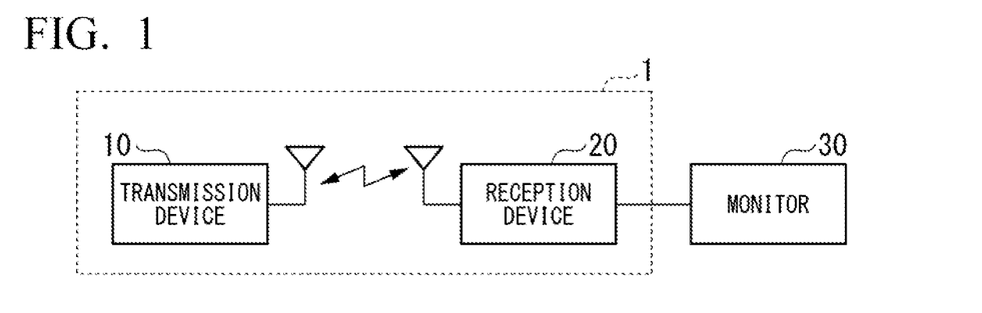
FIG. 1 is a block diagram showing a configuration of a communication system according to a first embodiment of the present invention.

FIG. 1 shows a configuration of a communication system 1 according to a first embodiment of the present invention. The communication system 1 shown in FIG. 1 includes a transmission device 10 and a reception device 20. The transmission device 10 and the reception device 20 perform wireless communication with each other. The transmission device 10 sequentially transmits image data to the reception device 20. The reception device 20 receives the image data from the transmission device 10 and records the image data. In addition, the reception device 20 transmits, to the transmission device 10, a retransmission request used for requesting retransmission of image data that have not been received. The reception device 20 outputs the received image data to a monitor 30 for real-time display to display the image data in real time after receiving the image data. Here, displaying image data in real time means displaying image data of a newly received frame in order in which the frame is received at each timing at which a synchronization signal indicating a start timing of display changes.

Figure 2:
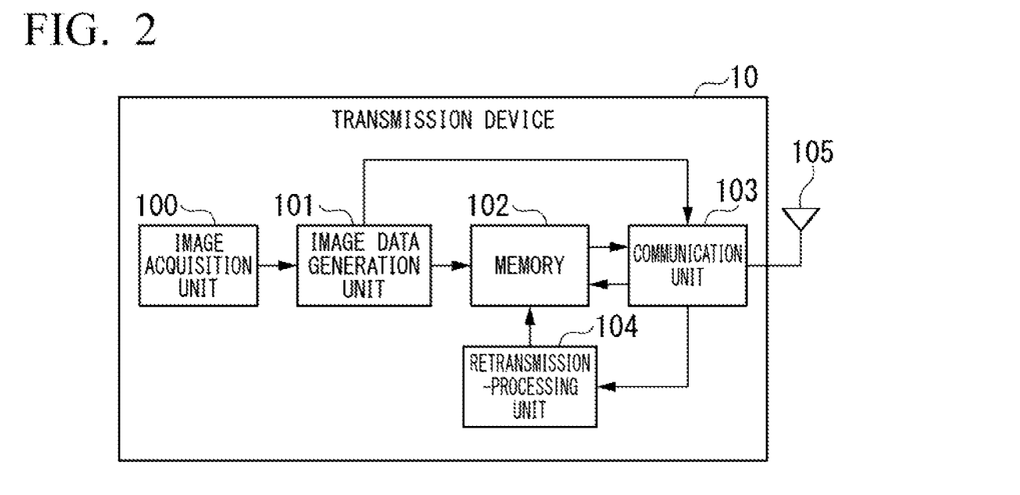
FIG. 2 is a block diagram showing a configuration of a transmission device included in the communication system according to the first embodiment of the present invention.

FIG. 2 shows a configuration of the transmission device 10. The transmission device 10 shown in FIG. 2 includes an image acquisition unit 100, an image data generation unit 101, a memory 102 (first memory), a communication unit 103 (first wireless communicator), and a retransmission-processing unit 104.

A schematic configuration of the transmission device 10 will be described. The image acquisition unit 100 acquires image data. The image data acquired by the image acquisition unit 100 are temporarily recorded on the memory 102. The communication unit 103 transmits image data including a sequence number to the reception device 20 and receives a retransmission request for requesting retransmission of image data from the reception device 20. When the communication unit 103 receives the retransmission request from the reception device 20, the retransmission-processing unit 104 executes retransmission processing of transmitting image data requested by using the retransmission request to the reception device 20 by using the communication unit 103.

A detailed configuration of the transmission device 10 will be described. The image acquisition unit 100 is equipment such as an image sensor. The image acquisition unit 100 acquires image data in units of a frame and outputs the image data to the image data generation unit 101. The image acquisition unit 100 may be a communication interface to which image data output from an image sensor of an external device are input.

The image data generation unit 101 compresses image data of a frame acquired from the image acquisition unit 100 as necessary. In addition, the image data generation unit 101 divides the compressed image data into communication units and generates image data (division data) used for communication by encoding the communication units. The image data generation unit 101 attaches header information including at least a sequence number to the image data. For example, the sequence number is an integer of one or more. The sequence numbers of two pieces of image data to be sequentially transmitted are sequential. The sequence number is used to check the continuity of image data. Thereafter, the image data generation unit 101 outputs the image data to the memory 102 and the communication unit 103. Compression, division, and encoding of the image data are not necessary.

The memory 102 is a volatile or nonvolatile recording medium on which the image data are backed up. For example, the memory 102 is at least one of a random-access memory (RAM), a dynamic random-access memory (DRAM), a static random-access memory (SRAM), an electrically erasable programmable read-only memory (EEPROM), a ferroelectric random-access memory (FRAM (registered trademark)), and a flash memory.

The memory 102 stores the image data output from the image data generation unit 101. When a data request including a sequence number is output from the communication unit 103, the memory 102 outputs image data having the sequence number to the communication unit 103. When a data deletion request including a sequence number is output from the communication unit 103, the memory 102 deletes image data having the sequence number.

The communication unit 103 is a wireless communicator. The communication unit 103 is connected to an antenna device 105. The communication unit 103 transmits the image data output from the image data generation unit 101 to the reception device 20 in real time. Here, transmitting image data in real time means processing image data of a newly generated frame immediately after the image data are generated and transmitting the image data in order in which the image data are generated. In addition, a circuit of the transmission device 10 may generate a synchronization signal indicating a start timing of transmission, and the communication unit 103 may transmit image data of a newly generated frame in order in which the frame is generated at each timing at which the synchronization signal changes. Moreover, timings of this synchronization signal may be synchronized with those of a synchronization signal that is generated in the reception device 20 and indicates a start timing of display. When a reception completion notification is received from the reception device 20, the communication unit 103 outputs the data deletion request to the memory 102.

When the retransmission request is received from the reception device 20, the communication unit 103 outputs the retransmission request to the retransmission-processing unit 104. The retransmission-processing unit 104 outputs a data request including a sequence number included in the retransmission request to the memory 102 and causes the memory 102 to output image data having the sequence number to the communication unit 103. The retransmission-processing unit 104 retransmits the image data to the reception device 20 by controlling the communication unit 103.

The priority of retransmission of the image data is lower than that of real-time transmission of the image data. For example, a method of differentiating the priority of retransmission and the priority of the real-time transmission from each other by changing the quality of service (QoS) of the real-time transmission may be used. When a communication completion button not shown in FIG. 2 is pressed, the communication unit 103 transmits a completion notification to complete the real-time transmission to the reception device 20. The transmission device 10 may include the antenna device 105.

The image data generation unit 101 and the retransmission-processing unit 104 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). The image data generation unit 101 and the retransmission-processing unit 104 may include one or more processors. The image data generation unit 101 and the retransmission-processing unit 104 may include one or more logic circuits.

The image data generation unit 101 and the retransmission-processing unit 104 may read a program and may execute the read program. The program includes commands defining the operations of the image data generation unit 101 and the retransmission-processing unit 104. In other words, the functions of the image data generation unit 101 and the retransmission-processing unit 104 may be realized by software. The program, for example, may be provided by using a "computer-readable recording medium" such as a flash memory. The program may be transmitted from a computer storing the program to the transmission device 10 through a transmission medium or by using carrier waves in a transmission medium. The "transmission medium" transmitting a program is a medium that has a function of transmitting information. The medium that has the function of transmitting information includes a network (communication network) such as the Internet and a communication circuit line (communication line) such as a telephone circuit line. The program described above may realize at least some of the functions described above. Furthermore, the program described above may be a differential file (differential program). The combination of a program that has already been recorded in a computer and a differential program may realize the functions described above.

Figure 3:
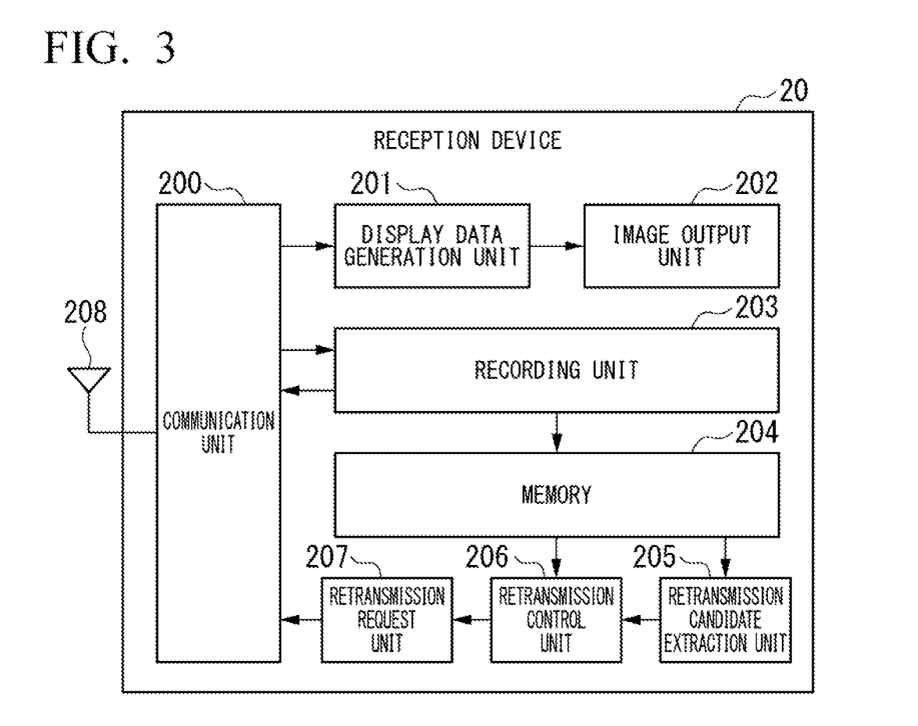
FIG. 3 is a block diagram showing a configuration of a reception device included in the communication system according to the first embodiment of the present invention.

FIG. 3 shows a configuration of the reception device 20. The reception device 20 shown in FIG. 3 includes a communication unit 200 (second wireless communicator), a display data generation unit 201, an image output unit 202, a recording unit 203, a memory 204 (second memory), a retransmission candidate extraction unit 205, a retransmission control unit 206, and a retransmission request unit 207.

A schematic configuration of the reception device 20 will be described. The communication unit 200 receives image data that are transmitted by the transmission device 10 and include a sequence number. A physical rate of the communication unit 200 and a communication rate of the image data are recorded on the memory 204. The recording unit 203 executes recording processing of recording the sequence number of the image data received by the communication unit 200 on the memory 204. The image output unit 202 executes image output processing of outputting the image data received by the communication unit 200 to the monitor 30.

The retransmission candidate extraction unit 205 executes identification processing of identifying a retransmission candidate on the basis of the sequence number recorded on the memory 204. The retransmission candidate indicates image data that have been transmitted by the transmission device 10 and have not been received by the communication unit 200. The retransmission control unit 206 executes calculation processing of calculating an upper limit retransmission number on the basis of the physical rate and the communication rate recorded on the memory 204. The upper limit retransmission number indicates an upper limit of the number of pieces of image data of which retransmission has been requested. The retransmission control unit 206 executes setting processing of setting an allowable retransmission number that is, for example, one or more and less than or equal to the upper limit retransmission number. When the number of the retransmission candidates identified through the identification processing exceeds the allowable retransmission number, the retransmission request unit 207 executes retransmission request processing of transmitting a retransmission request for requesting retransmission of as many of the retransmission candidates as the allowable retransmission number to the transmission device 10 by using the communication unit 200.

A detailed configuration of the reception device 20 will be described. The communication unit 200 is a wireless communicator. The communication unit 200 is connected to an antenna device 208. The communication unit 200 performs wireless communication with the communication unit 103 of the transmission device 10. The communication unit 200 receives image data (real-time image data) transmitted in real time from the transmission device 10. In addition, the communication unit 200 receives image data (retransmitted image data) retransmitted from the transmission device 10. The communication unit 200 outputs the real-time image data that have been received to the display data generation unit 201 and the recording unit 203. In addition, the communication unit 200 outputs the retransmitted image data that have been received to the recording unit 203.

When a reception completion instruction is output from the recording unit 203, the communication unit 200 generates a reception completion notification and transmits the reception completion notification to the transmission device 10. The reception completion instruction indicates that a period of time allocated for receiving image data of one frame has passed. Image data of one frame are constituted by multiple pieces of image data that have been divided. The reception completion notification includes a sequence number of the real-time image data or the retransmitted image data that have been correctly received.

When a retransmission request instruction for requesting retransmission of image data to the transmission device 10 is output from the retransmission request unit 207, the communication unit 200 generates a retransmission request and transmits the retransmission request to the transmission device 10. The retransmission request includes a sequence number of the real-time image data or the retransmitted image data that have not been correctly received.

The communication unit 200 outputs a present physical rate and communication rate (required rate) to the recording unit 203. The physical rate indicates a maximum data rate at which the communication unit 200 can communicate per unit time at present. The communication unit 200 determines the physical rate on the basis of a modulation method, a code ratio, a communication channel width, the number of streams, and the like. The communication rate indicates a necessary data rate for real-time communication of image data. The communication unit 200 determines the communication rate on the basis of a compression ratio of the image data, the size of a header and a footer attached to the image data, an overhead of communication, a necessary margin for a retransmission time, and the like. After a completion notification is received from the transmission device 10, the real-time transmission is not performed. Therefore, the communication rate becomes 0. The physical rate may be recorded on the memory 204 in advance.

The display data generation unit 201 decodes the real-time image data output from the communication unit 200. In addition, the display data generation unit 201 links two or more pieces of the real-time image data together, thus generating image data of one frame. The display data generation unit 201 outputs the generated image data to the image output unit 202.

The image output unit 202 outputs the image data to the monitor 30 via a video communication interface not shown in FIG. 3. The monitor 30 displays an image indicated by the image data. The reception device 20 may include a monitor.

There is a case in which a communication error occurs and divided real-time image data in image data of one frame are not acquired before a predetermined time point. In such a case, the reception device 20 detects loss of the image data by using a sequence number of the image data and displays an error indicating that the image data have been lost. Alternatively, the reception device 20 does not update image display and displays an image previously correctly displayed on the monitor 30 again.

The recording unit 203 records the real-time image data and the retransmitted image data output from the communication unit 200 on the memory 204. In this way, the sequence number included in each piece of the image data is recorded on the memory 204. The recording unit 203 records the physical rate and the communication rate acquired from the communication unit 200 on the memory 204. When a period of time allocated for receiving image data of one frame has passed, the recording unit 203 outputs a reception completion instruction to the communication unit 200.

The memory 204 is a nonvolatile recording medium on which the image data are saved. For example, the memory 204 is at least one of an EEPROM, an FRAM, and a flash memory. The physical rate and the communication rate may be recorded on a volatile memory such as a RAM or a DRAM.

The retransmission candidate extraction unit 205 checks the continuity of sequence numbers on the basis of the sequence numbers recorded on the memory 204. A sequence number is lost at a position at which the sequence numbers are not sequential. Image data having the lost sequence number have been transmitted from the transmission device 10, but have not been correctly recorded on the memory 204. The retransmission candidate extraction unit 205 extracts a sequence number of image data that have not been correctly recorded. In this way, the retransmission candidate extraction unit 205 identifies a retransmission candidate. The retransmission candidate extraction unit 205 outputs retransmission candidate information including the extracted sequence number to the retransmission control unit 206.

The retransmission control unit 206 calculates an upper limit retransmission number on the basis of the physical rate and the required rate recorded on the memory 204. For example, when the physical rate is 1 Mbit/frame and the required rate is 0.6 Mbit/frame and the size of a retransmission packet is 12 Kbit, the upper limit retransmission number indicates 33 packets, as an expression "(1 Mbit−0.6 Mbit)/12 Kbit=33" shows. The retransmission control unit 206 sets an allowable retransmission number that does not exceed the upper limit retransmission number. For example, an initial value of the allowable retransmission number indicates one packet. The retransmission control unit 206 selects as many sequence numbers as the allowable retransmission number from sequence numbers included in the retransmission candidate information output from the retransmission candidate extraction unit 205. The retransmission control unit 206 may preferentially select a sequence number of image data transmitted prior to other image data. Alternatively, the retransmission control unit 206 may randomly select a sequence number. The retransmission control unit 206 outputs a sequence number list including the selected sequence number to the retransmission request unit 207.

The retransmission request unit 207 outputs a retransmission request instruction including the sequence number list output from the retransmission control unit 206 to the communication unit 200. The retransmission request unit 207 transmits a retransmission request to the transmission device 10 by controlling the communication unit 200.

The display data generation unit 201, the image output unit 202, the recording unit 203, the retransmission candidate extraction unit 205, the retransmission control unit 206, and the retransmission request unit 207 may be constituted by at least one of a processor and a logic circuit. The display data generation unit 201, the image output unit 202, the recording unit 203, the retransmission candidate extraction unit 205, the retransmission control unit 206, and the retransmission request unit 207 may include one or more processors. The display data generation unit 201, the image output unit 202, the recording unit 203, the retransmission candidate extraction unit 205, the retransmission control unit 206, and the retransmission request unit 207 may include one or more logic circuits.

The display data generation unit 201, the image output unit 202, the recording unit 203, the retransmission candidate extraction unit 205, the retransmission control unit 206, and the retransmission request unit 207 may read a program and may execute the read program. The program is realized similarly to that realizing the functions of the image data generation unit 101 and the retransmission-processing unit 104 of the transmission device 10.

Figure 4:
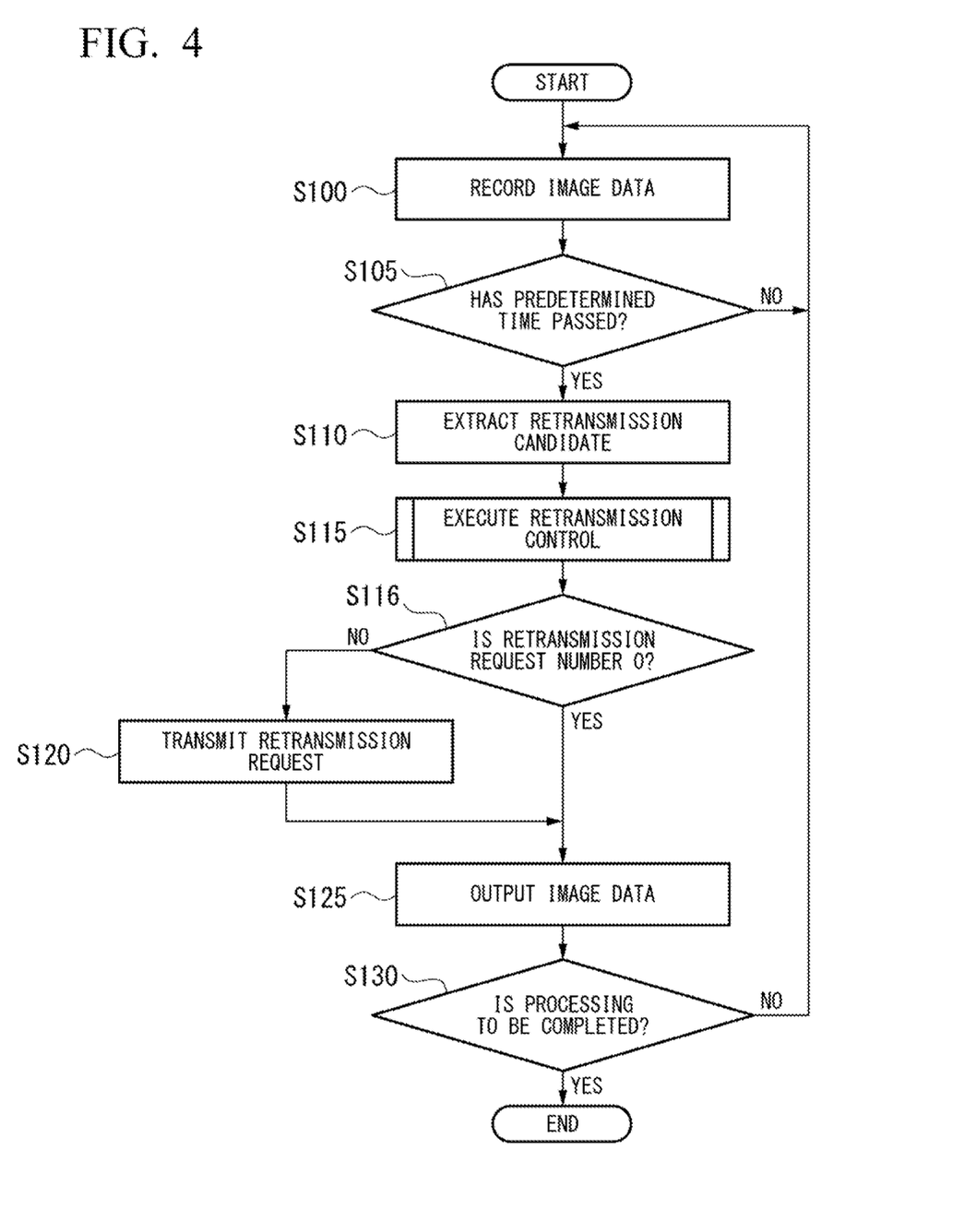
FIG. 4 is a flow chart showing a procedure of an operation of the reception device included in the communication system according to the first embodiment of the present invention.

A flow of processing executed by the reception device 20 will be described by referring to FIG. 4, FIG. 5, and FIG. 6. FIG. 4 shows processing related to the entire processing of recording and retransmitting image data.

(Step S100)

The recording unit 203 records real-time image data and retransmitted image data acquired from the communication unit 200 on the memory 204. In this way, a sequence number included in each piece of the image data is recorded on the memory 204. Step S100 corresponds to the recording processing.

(Step S105)

After Step S100, the retransmission candidate extraction unit 205 waits until a predetermined time in one frame period has passed by using a timer or the like not shown in FIG. 3. The predetermined time indicates a period of time allocated for receiving image data of one frame. Step S100 and Step S105 are repeatedly executed until the predetermined time has passed. When the predetermined time has passed, Step S110 is executed.

(Step S110)

The retransmission candidate extraction unit 205 checks the continuity of sequence numbers on the basis of the sequence numbers recorded on the memory 204. The retransmission candidate extraction unit 205 extracts a sequence number of image data that have not been correctly recorded. The extracted sequence number indicates image data as a retransmission candidate. The retransmission candidate extraction unit 205 outputs retransmission candidate information including the extracted sequence number to the retransmission control unit 206. Step S110 corresponds to the identification processing.

(Step S115)

After Step S110, the retransmission control unit 206 calculates an upper limit retransmission number on the basis of the physical rate and the required rate recorded on the memory 204 and sets an allowable retransmission number. When it is highly probable that a communication band that does not press the real-time transmission of image data is secured, in other words, the number of sequence numbers included in the retransmission candidate information is less than the allowable retransmission number, the retransmission control unit 206 selects all the sequence numbers included in the retransmission candidate information output from the retransmission candidate extraction unit 205. When it is less likely that the communication band is secured (it may be impossible to secure the communication band), in other words, the number of sequence numbers included in the retransmission candidate information is greater than the allowable retransmission number, the retransmission control unit 206 selects as many sequence numbers as the allowable retransmission number from the sequence numbers included in the retransmission candidate information. The retransmission control unit 206 outputs a sequence number list including the selected sequence numbers to the retransmission request unit 207. Step S115 corresponds to the calculation processing and the setting processing.

(Step S116)

After Step S115, the retransmission request unit 207 determines whether the retransmission request number calculated in Step S115 is 0. When the retransmission request unit 207 determines that the retransmission request number is 0, Step S125 is executed. When the retransmission request unit 207 determines that the retransmission request number is greater than or equal to 1, Step S120 is executed.

(Step S120)

The retransmission request unit 207 outputs a retransmission request instruction including the sequence number list output from the retransmission control unit 206 to the communication unit 200. The retransmission request unit 207 transmits the retransmission request instruction to the transmission device 10 by controlling the communication unit 200. Step S120 corresponds to the retransmission request processing.

(Step S125)

After Step S120, the image output unit 202 outputs image data of one frame generated by the display data generation unit 201 to the monitor 30. Step S125 corresponds to the image output processing. Step S125 may be executed before Step S110, Step S115, or Step S120 is executed.

(Step S130)

After Step S125, a condition for completing processing is determined. When the communication unit 200 has received a completion notification from the transmission device 10, the processing shown in FIG. 4 is completed. When the communication unit 200 has not received the completion notification from the transmission device 10, Step S100 is executed in a next frame period to the present frame period.

Figure 5:
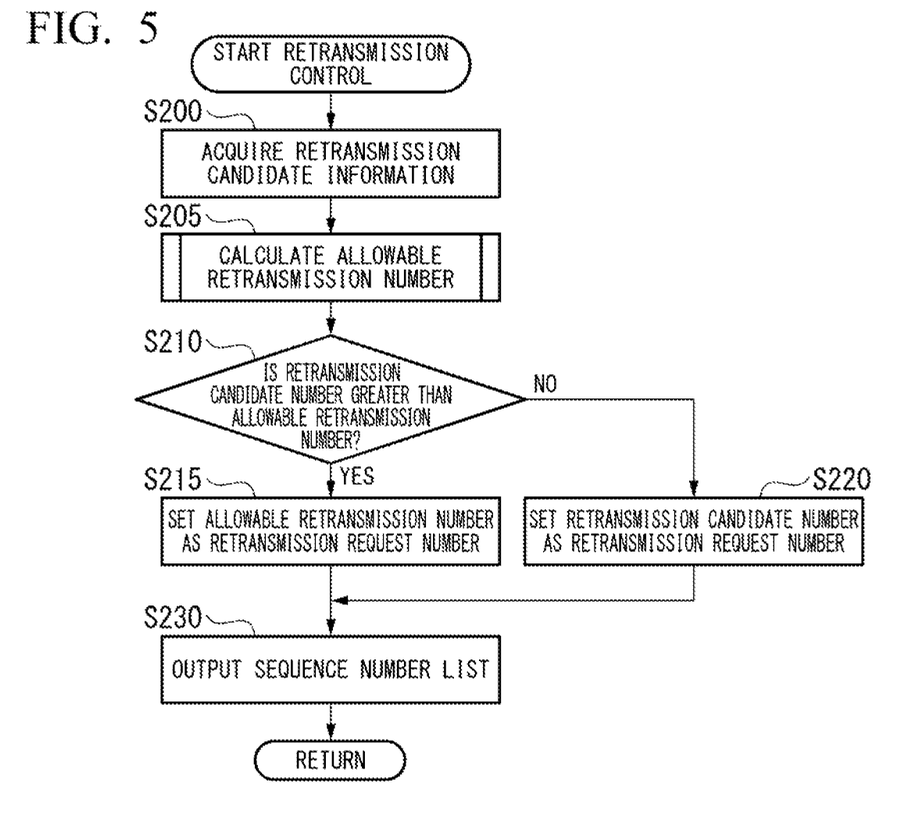
FIG. 5 is a flow chart showing a procedure of an operation of the reception device included in the communication system according to the first embodiment of the present invention.
Figure 6:
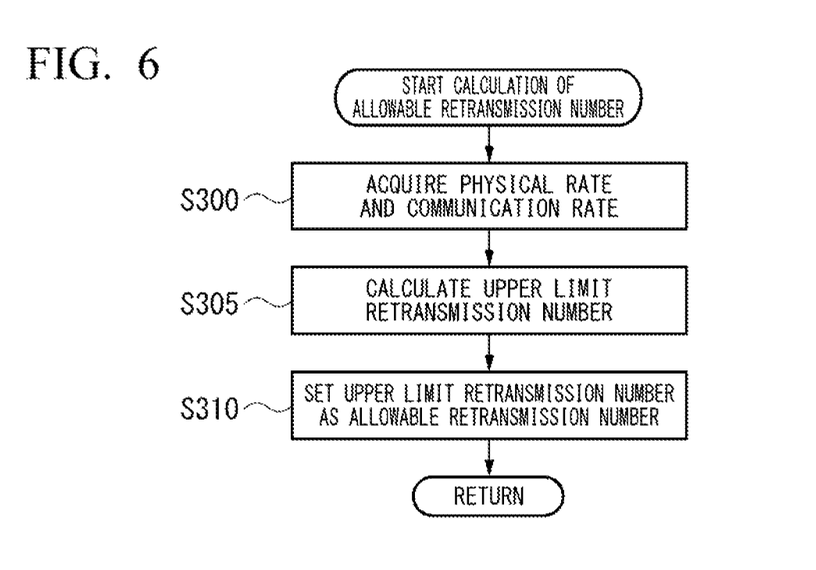
FIG. 6 is a flow chart showing a procedure of an operation of the reception device included in the communication system according to the first embodiment of the present invention.

FIG. 5 shows details of the processing in Step S115. Hereinafter, the details of the processing in Step S115 will be described.

(Step S200)

The retransmission control unit 206 acquires the retransmission candidate information from the retransmission candidate extraction unit 205.

(Step S205)

After Step S200, the retransmission control unit 206 calculates an allowable retransmission number. FIG. 6 shows details of the processing in Step S205.

(Step S300)

The retransmission control unit 206 acquires the physical rate and the communication rate from the memory 204.

(Step S305)

After Step S300, the retransmission control unit 206 calculates an upper limit retransmission number on the basis of the physical rate and the communication rate. For example, the upper limit retransmission number is expressed by the following Expression (1).

$$ULN=(PR-CR)/DL \tag{1}$$

In Expression (1), ULN indicates the upper limit retransmission number, PR indicates the physical rate, and CR indicates the communication rate. In Expression (1), DL indicates a data length of a piece of divided image data. The upper limit retransmission number is calculated on the basis of the difference between the physical rate and the communication rate. In a case in which the number calculated through Expression (1) is not an integer, the retransmission control unit 206 may extract an integer part of the calculated number and may use the integer part as the upper limit retransmission number. Step S305 corresponds to a calculation step.

The data length DL in Expression (1) depends on compression processing executed by the image data generation unit 101 of the transmission device 10. In a case in which the image data generation unit 101 uses fixed-length compression, the data length DL is a fixed length set in advance. In such a case, the memory 204 stores the data length DL in advance. The retransmission control unit 206 acquires the data length DL from the memory 204.

In a case in which the image data generation unit 101 uses variable-length compression, the data length DL varies every frame period. In such a case, the communication unit 103 of the transmission device 10 transmits a data length notification including the data length DL to the reception device 20 at the beginning of a frame period. The communication unit 200 of the reception device 20 receives the data length notification and outputs the data length notification to the recording unit 203. The recording unit 203 records the data length DL included in the data length notification output from the communication unit 200 on the memory 204. The retransmission control unit 206 acquires the data length DL from the memory 204.
(Step S310)

After Step S305, the retransmission control unit 206 sets the upper limit retransmission number calculated in Step S305 as an allowable retransmission number. The retransmission control unit 206 may set an integer of one or more and less than the upper limit retransmission number as the allowable retransmission number. Step S310 corresponds to a setting step. After Step S310, Step S210 shown in FIG. 5 is executed.
(Step S210)

After Step S310, the retransmission control unit 206 compares a retransmission candidate number and the allowable retransmission number with each other. The retransmission candidate number is the same as the number of sequence numbers included in the retransmission candidate information acquired from the retransmission candidate extraction unit 205. The retransmission candidate number is an integer of zero or more. When the retransmission candidate number exceeds the allowable retransmission number, Step S215 is executed. When the retransmission candidate number is less than or equal to the allowable retransmission number, Step S220 is executed.
(Step S215)

In a case in which the retransmission candidate number exceeds the allowable retransmission number, it is highly probable that a necessary communication band for retransmission of all the image data that have not been received cannot be secured. Therefore, the retransmission control unit 206 sets the allowable retransmission number as a retransmission request number. When the retransmission candidate number exceeds the upper limit retransmission number, the retransmission request number is set to be the same as the allowable retransmission number. The allowable retransmission number is the same as the upper limit retransmission number calculated in Step S305. Thus, when the retransmission candidate number exceeds the upper limit retransmission number, the retransmission request number is set to be the same as the upper limit retransmission number.
(Step S220)

When the retransmission candidate number is less than or equal to the allowable retransmission number, the necessary communication band for retransmission of all the image data that have not been received can be secured. Therefore, the retransmission control unit 206 sets the retransmission candidate number as the retransmission request number. When the retransmission candidate number does not exceed the upper limit retransmission number, the retransmission request number is set to be the same as the retransmission candidate number.
(Step S230)

After Step S215 or Step S220, the retransmission control unit 206 selects as many sequence numbers as the retransmission request number from the sequence numbers included in the retransmission candidate information. The retransmission control unit 206 outputs a sequence number list including the selected sequence numbers to the retransmission request unit 207.

In the first embodiment, when the number of pieces of image data that have not been received exceeds the allowable retransmission number, the reception device 20 requests retransmission of as many pieces of image data as the allowable retransmission number to the transmission device 10. Therefore, the communication system 1 can preferentially perform necessary communication for real-time display and can efficiently perform data retransmission.

Modified Example of First Embodiment

Figure 7:
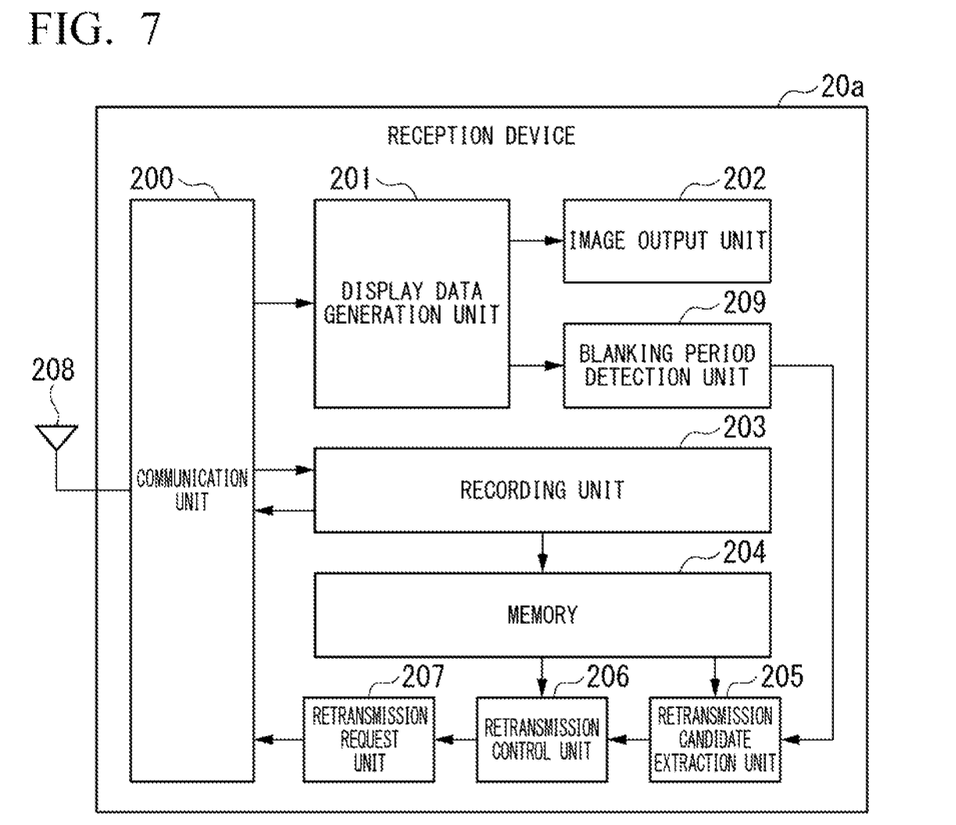
FIG. 7 is a block diagram showing a configuration of a reception device included in a communication system according to a modified example of the first embodiment of the present invention.

A modified example of the first embodiment of the present invention will be described. The reception device 20 shown in FIG. 3 is changed to a reception device 20*a* shown in FIG. 7. FIG. 7 shows a configuration of the reception device 20*a*. The reception device 20*a* shown in FIG. 7 includes a communication unit 200, a display data generation unit 201, an image output unit 202, a recording unit 203, a memory 204, a retransmission candidate extraction unit 205, a retransmission control unit 206, a retransmission request unit 207, and a blanking period detection unit 209. The same configuration as that shown in FIG. 3 will not be described.

The blanking period detection unit 209 may be constituted by at least one of a processor and a logic circuit. The blanking period detection unit 209 may include one or more processors. The blanking period detection unit 209 may include one or more logic circuits. The blanking period detection unit 209 may read a program and may execute the read program.

The display data generation unit 201 generates a synchronization signal and outputs a vertical blanking signal for display included in the synchronization signal to the blanking period detection unit 209. The blanking period detection unit 209 detects a start timing of a blanking period on the basis of the vertical blanking signal output from the display data generation unit 201. When the timing is detected, the blanking period detection unit 209 outputs timing information indicating the start of the blanking period to the retransmission candidate extraction unit 205. The blanking period occurs between a display period of image data of one frame and a display period of image data of the next one frame.

The retransmission candidate extraction unit 205, the retransmission control unit 206, and the retransmission request unit 207 stop processing related to retransmission control until the blanking period is started. When the blanking period is started, the timing information is output from the blanking period detection unit 209 to the retransmission candidate extraction unit 205. At this time, the retransmission candidate extraction unit 205 starts the processing.

Figure 8:
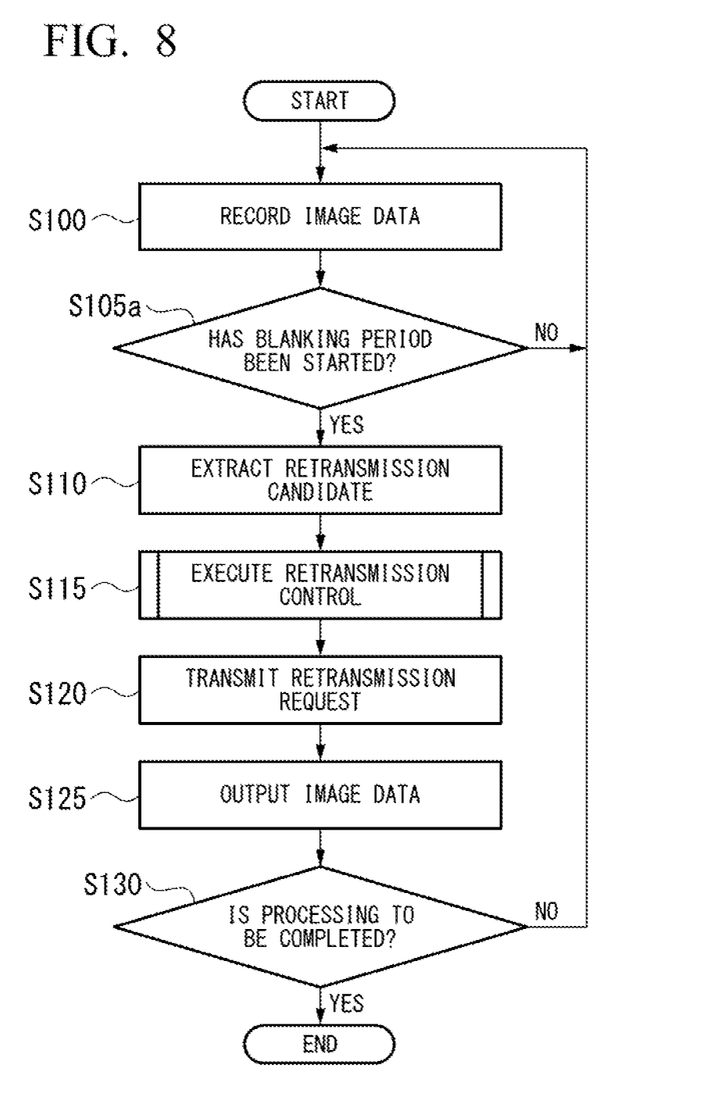
FIG. 8 is a flow chart showing a procedure of an operation of the reception device included in the communication system according to the modified example of the first embodiment of the present invention.

The processing shown in FIG. 4 is changed to processing shown in FIG. 8. A flow of processing executed by the reception device 20*a* will be described by referring to FIG. 8. The same processing as that shown in FIG. 4 will not be described.
(Step S105*a*)

Step S105 shown in FIG. 4 is changed to Step S105*a*. The blanking period detection unit 209 determines whether a blanking period has been started on the basis of the vertical blanking signal output from the display data generation unit 201. Step S100 and Step S105*a* are repeatedly executed until the blanking period is started. When the blanking period detection unit 209 determines that the blanking period has been started, the blanking period detection unit 209 outputs timing information to the retransmission candidate extraction unit 205.

When the timing information is output from the blanking period detection unit 209, the retransmission candidate extraction unit 205 executes Step S110. Step S110, Step S115, Step S120, and Step S125 are executed in the blanking period.

In a case in which the reception device 20*a* fails to receive image data in a frame period, the reception device 20*a* transmits a retransmission request of the image data to the transmission device 10 in a blanking period included in the frame period during which the image data are transmitted. The reception device 20a may transmit the retransmission request of the image data to the transmission device 10 in a blanking period included in a frame period after the frame period during which the image data are transmitted.

In the example shown in FIG. 8, the retransmission candidate extraction unit 205 executes the identification processing in a blanking period. The retransmission control unit 206 executes the calculation processing and the setting processing in the blanking period. The retransmission request unit 207 executes the retransmission request processing in the blanking period. The blanking period is a period from a first timing to a second timing. The first timing comes after transmission (real-time transmission) of N-th frame data including one or more pieces of image data for the first time is completed. This transmission for the first time does not include retransmission of the image data in accordance with the retransmission request. The second timing comes after the first timing and before transmission of (N+1)-th frame data including one or more pieces of image data for the first time is started. The number N is an integer of one or more. For example, the N-th frame data constitute image data of one frame transmitted in an N-th frame period, and the (N+1)-th frame data constitute image data of one frame transmitted in an (N+1)-th frame period.

The retransmission request unit 207 may execute the retransmission request processing in a blanking period after transmission of K-th frame data including one or more pieces of image data for the first time is completed, thus transmitting a retransmission request of M-th frame data including one or more pieces of image data to the transmission device 10. The number M is an integer of one or more. The number K is an integer that is greater than or equal to (M+1). For example, the M-th frame data constitute image data of one frame transmitted in an M-th frame period, and the K-th frame data constitute image data of one frame transmitted in a K-th frame period. The K-th frame period comes after the M-th frame period.

In the modified example of the first embodiment, the reception device 20a requests retransmission of image data to the transmission device 10 in a blanking period. Therefore, the communication system 1 can preferentially perform necessary communication for real-time display and can efficiently perform data retransmission.

Second Embodiment

A second embodiment of the present invention will be described. The communication system 1 according to the second embodiment includes the transmission device 10 and the reception device 20 shown in FIG. 3.

The retransmission control unit 206 further executes checking processing of checking a retransmission success number in addition to the calculation processing and the setting processing in the first embodiment. The retransmission success number indicates the number of retransmission candidates that are successfully received after the retransmission request is transmitted. The retransmission control unit 206 sets the retransmission success number as an allowable retransmission number in the setting processing.

A flow of processing executed by the reception device 20 will be described. The reception device 20 executes processing shown in FIG. 4, FIG. 5, and FIG. 9. The processing shown in FIG. 6 is changed to the processing shown in FIG. 9. The processing shown in FIG. 4 and FIG. 5 will not be described. Hereinafter, details of the processing shown in FIG. 9 will be described. The same processing as that shown in FIG. 6 will not be described.

(Step S320)

Figure 9:
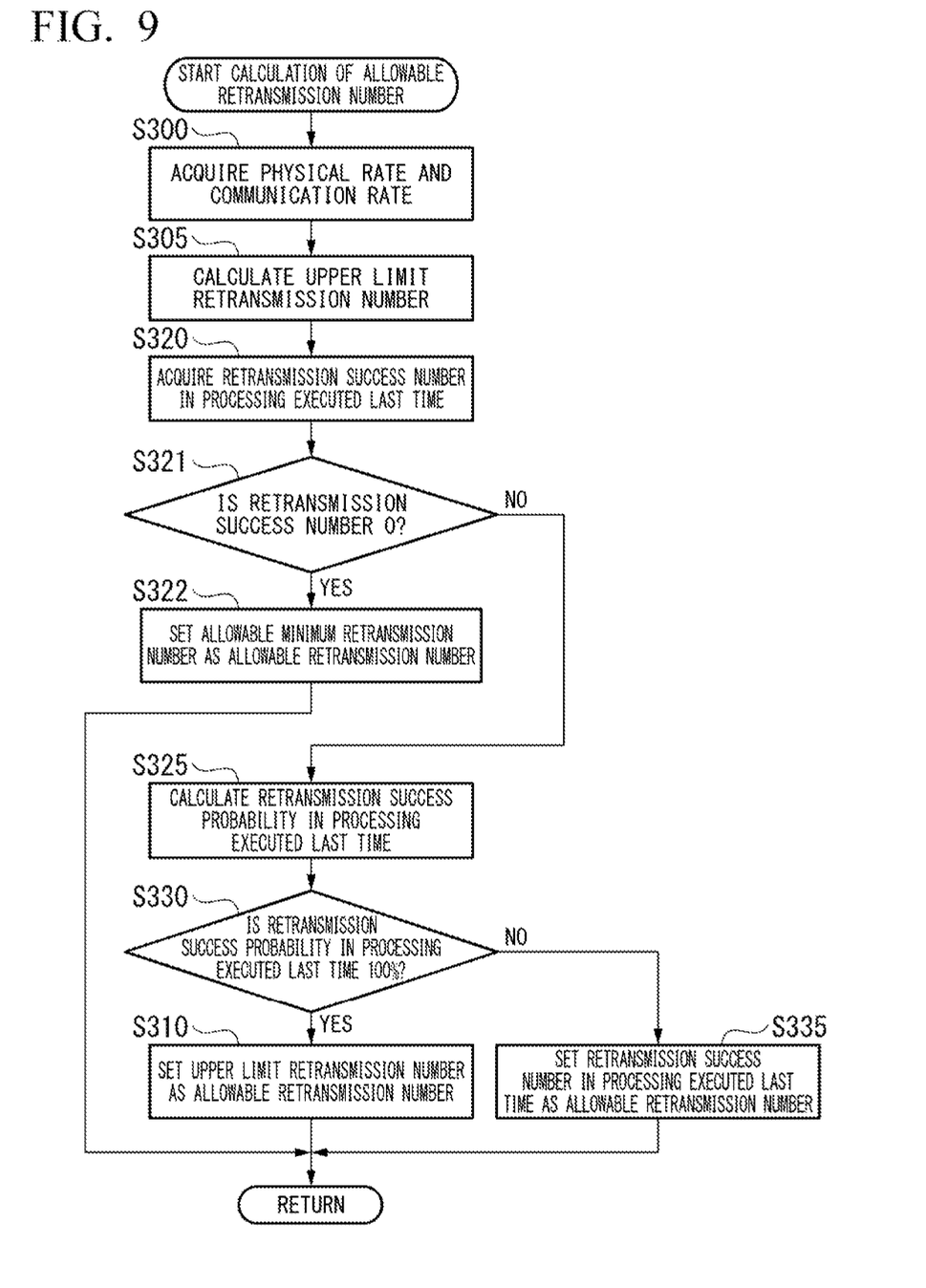
FIG. 9 is a flow chart showing a procedure of an operation of a reception device included in a communication system according to a second embodiment of the present invention.

After Step S305, the retransmission control unit 206 acquires a retransmission success number on the basis of the sequence number list generated last time and a sequence number recorded on the memory 204. The sequence number list includes a sequence number of image data of which retransmission has been requested. The sequence number list generated last time is the one generated in the frame period preceding the present frame period. In a case in which the transmission device 10 retransmits image data and the communication unit 200 receives the image data, the sequence number of the image data is recorded on the memory 204. The retransmission control unit 206 compares the sequence number (first sequence number) included in the sequence number list and the sequence number (second sequence number) recorded on the memory 204 with each other. The retransmission control unit 206 acquires the number of second sequence numbers matching the first sequence number as the retransmission success number. The retransmission success number is an integer of zero or more. Step S320 corresponds to the checking processing.

(Step S321)

After Step S320, the retransmission control unit 206 determines whether the retransmission success number calculated in Step S320 is 0. When the retransmission control unit 206 determines that the retransmission success number is 0, Step S322 is executed. When the retransmission control unit 206 determines that the retransmission success number is greater than or equal to 1, Step S325 is executed.

(Step S322)

The retransmission control unit 206 sets an allowable minimum retransmission number (for example, 1) as an allowable retransmission number. The allowable minimum retransmission number may be a predetermined value other than 1. After Step S322, Step S210 shown in FIG. 5 is executed.

(Step S325)

The retransmission control unit 206 calculates a retransmission success probability on the basis of the retransmission success number calculated in Step S320 and a retransmission request number in the processing executed last time. The retransmission request number in the processing executed last time is the number of sequence numbers included in the sequence number list generated last time. The retransmission success probability is expressed by the following Expression (2).

$$PS = SN/RN \qquad (2)$$

In Expression (2), PS indicates the retransmission success probability, SN indicates the retransmission success number, and RN indicates the retransmission request number.

(Step S330)

After Step S325, the retransmission control unit 206 determines whether the retransmission success probability calculated in Step S325 is 100%. When the retransmission control unit 206 determines that the retransmission success probability is 100%, Step S310 is executed. When the retransmission control unit 206 determines that the retransmission success probability is not 100%, Step S335 is executed.

(Step S335)

The retransmission control unit 206 sets the retransmission success number acquired in Step S320 as the allowable retransmission number. Step S335 corresponds to the setting step. After Step S335, Step S210 shown in FIG. 5 is executed.

In a case in which the retransmission success probability in the processing executed last time is not 100%, the retransmission success number in the processing executed last time is less than the retransmission request number in the processing executed last time. The retransmission request number is less than or equal to the allowable retransmission number. In a case in which the retransmission success probability is not 100%, the retransmission success number in the processing executed last time is less than the allowable retransmission number in the processing executed last time. Since the retransmission success number is set as a new allowable retransmission number in Step S335, the new allowable retransmission number is less than the allowable retransmission number in the processing executed last time. However, even when the retransmission success probability is 0%, the lower limit number of the allowable retransmission number is set to 1. In this way, it is possible to monitor whether retransmission is feasible.

There is a case in which a source or the like of an interference signal nears the vicinity of the transmission device 10 or the reception device 20 and the communication state instantaneously deteriorates. In such a case, the reception device 20 sets the retransmission success number in the processing executed last time as a new allowable retransmission number, thus reducing the new allowable retransmission number such that the new allowable retransmission number is less than the allowable retransmission number in the processing executed last time. Although the number of pieces of image data that the transmission device 10 can retransmit is reduced, the communication system 1 can efficiently perform data retransmission.

Modified Example of Second Embodiment

Figure 10:
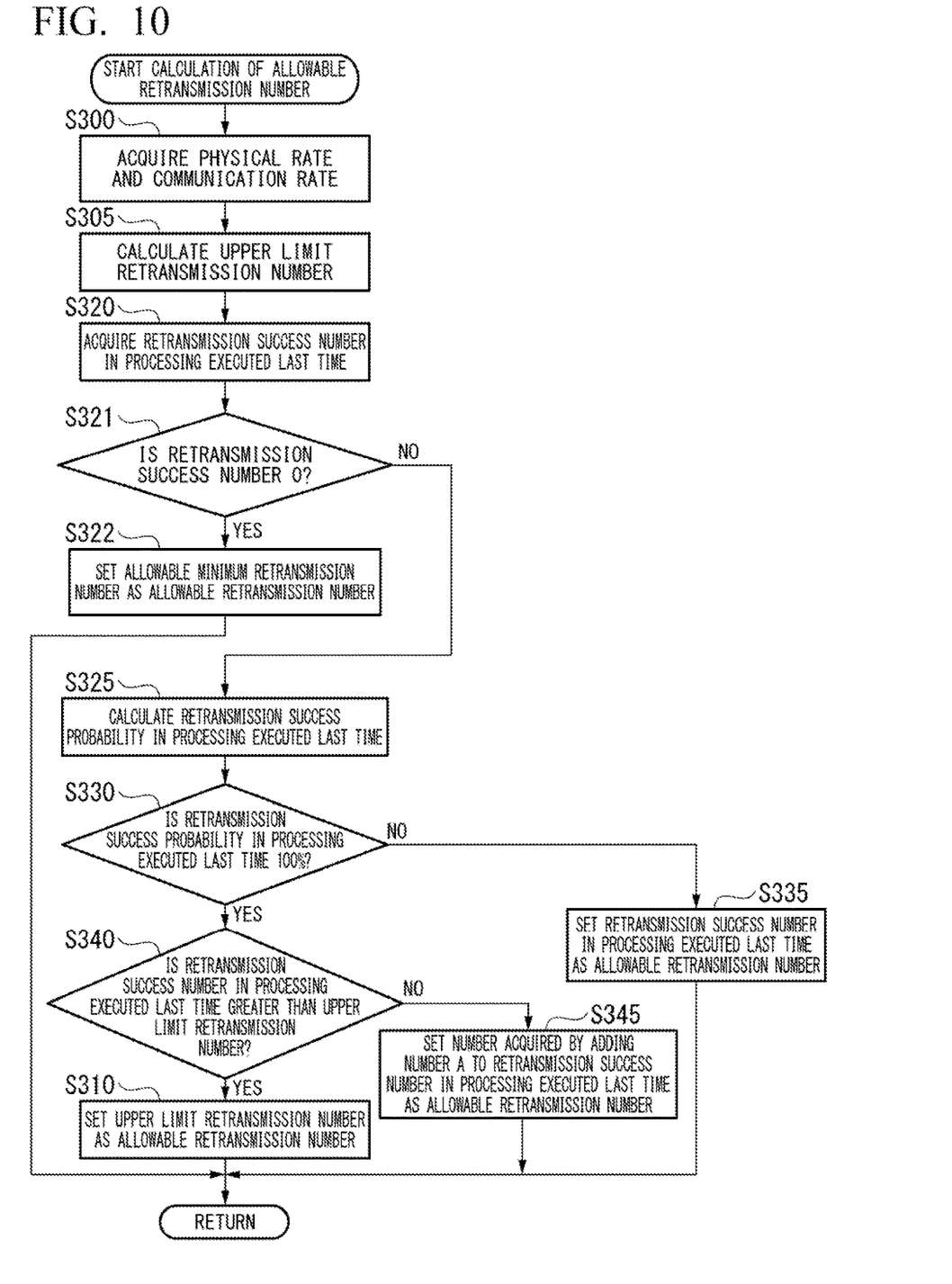
FIG. 10 is a flow chart showing a procedure of an operation of a reception device included in a communication system according to a modified example of the second embodiment of the present invention.

A modified example of the second embodiment of the present invention will be described. When the allowable retransmission number set through the setting processing matches the retransmission success number checked through the checking processing, the retransmission control unit 206 increases the allowable retransmission number by executing the setting processing again.

A flow of processing executed by the reception device 20 will be described. The reception device 20 executes processing shown in FIG. 4, FIG. 5, and FIG. 10. The processing shown in FIG. 9 is changed to the processing shown in FIG. 10. The processing shown in FIG. 4 and FIG. 5 will not be described. Hereinafter, details of the processing shown in FIG. 10 will be described. The same processing as that shown in FIG. 9 will not be described.

(Step S340)

When the retransmission control unit 206 determines that the retransmission success probability is 100% in Step S330, the retransmission control unit 206 determines whether the retransmission success number acquired in Step S320 is greater than the upper limit retransmission number calculated in Step S305. For example, when the retransmission control unit 206 determines that the physical rate is changed from the one in the processing executed last time and the retransmission success number is greater than the upper limit retransmission number, Step S310 is executed. When the retransmission control unit 206 determines that the retransmission success number is less than or equal to the upper limit retransmission number, Step S345 is executed.

(Step S345)

The retransmission control unit 206 sets a number acquired by adding a predetermined number A to the retransmission success number acquired in Step S320 as an allowable retransmission number. The predetermined number A is an integer of one or more. The predetermined number A is adjusted such that the allowable retransmission number does not exceed the upper limit retransmission number. Step S345 corresponds to the setting step. After Step S345, Step S210 shown in FIG. 5 is executed.

When the retransmission success probability in the processing executed last time is 100% and the retransmission success number in the processing executed last time is less than or equal to the present upper limit retransmission number, Step S345 is executed. The number acquired in Step S345 by adding the predetermined number A to the retransmission success number in the processing executed last time is set as a new allowable retransmission number. When the retransmission success probability in the processing executed last time is 100%, the retransmission success number in the processing executed last time is the same as the retransmission request number in the processing executed last time. Therefore, the new allowable retransmission number is greater than the retransmission request number in the processing executed last time. When Step S345 is executed, the allowable retransmission number increases.

As the source or the like of the interference signal in the vicinity of the transmission device 10 or the reception device 20 goes away, the allowable retransmission number gradually increases. Therefore, the reception device 20 can restore the allowable retransmission number while checking the influence on the real-time transmission of image data. Accordingly, the reception device 20 can reduce the influence on the real-time transmission of image data.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A reception device, comprising:
   a wireless communicator configured to receive image data that are transmitted by a transmission device and include a sequence number;
   a memory on which a physical rate of the wireless communicator and a communication rate of the image data are recorded; and
   one or more processors configured to execute:
      recording processing of recording the sequence number of the image data received by the wireless communicator on the memory;
      image output processing of outputting the image data received by the wireless communicator to a monitor;
      identification processing of identifying a retransmission candidate on the basis of the sequence number recorded on the memory,
         wherein the retransmission candidate indicates image data that have been transmitted by the transmission device and have not been received by the wireless communicator;

calculation processing of calculating an upper limit retransmission number on the basis of the physical rate and the communication rate recorded on the memory,
　　wherein the upper limit retransmission number indicates an upper limit of the number of pieces of image data of which retransmission has been requested;
setting processing of setting an allowable retransmission number that is less than or equal to the upper limit retransmission number; and
retransmission request processing of transmitting a retransmission request for requesting retransmission of as many of the retransmission candidates as the allowable retransmission number to the transmission device by using the wireless communicator when the number of the retransmission candidates identified through the identification processing exceeds the allowable retransmission number,
wherein the one or more processors are configured to execute the retransmission request processing in a blanking period,
wherein the blanking period is a period from a first timing to a second timing,
wherein the first timing comes after transmission of N-th frame data including one or more pieces of image data for the first time is completed,
wherein the second timing comes after the first timing and before transmission of (N+1)-th frame data including one or more pieces of image data for the first time is started,
wherein N is an integer of one or more,
wherein the one or more processors are configured to execute the retransmission request processing in the blanking period after transmission of K-th frame data including one or more pieces of image data for the first time is completed so as to transmit the retransmission request of M-th frame data including one or more pieces of image data to the transmission device, and
wherein M is an integer of one or more and K is an integer that is greater than or equal to (M+1).

2. The reception device according to claim 1,
wherein the one or more processors are configured to further execute checking processing of checking a retransmission success number,
wherein the retransmission success number indicates the number of the retransmission candidates that are successfully received by the wireless communicator after the retransmission request is transmitted, and
wherein the one or more processors are configured to set the retransmission success number as the allowable retransmission number in the setting processing.

3. The reception device according to claim 2,
wherein the one or more processors are configured to increase the allowable retransmission number by executing the setting processing again when the allowable retransmission number set through the setting processing matches the retransmission success number checked through the checking processing.

4. The reception device according to claim 1,
wherein the one or more processors are configured to further execute checking processing of checking a retransmission success number,
wherein the retransmission success number indicates the number of the retransmission candidates that are successfully received by the wireless communicator after the retransmission request is transmitted, and
wherein the one or more processors are configured to increase the allowable retransmission number by executing the setting processing again when the allowable retransmission number set through the setting processing matches the retransmission success number checked through the checking processing.

5. A communication system, comprising:
a transmission device; and
a reception device,
wherein the transmission device comprises:
　　a first memory on which image data are temporarily recorded;
　　a first wireless communicator configured to transmit the image data including a sequence number to the reception device and receive a retransmission request for requesting retransmission of the image data from the reception device; and
　　one or more first processors configured to execute retransmission processing of transmitting the image data requested by using the retransmission request to the reception device by using the first wireless communicator when the first wireless communicator receives the retransmission request from the reception device, and
wherein the reception device comprises:
　　a second wireless communicator configured to receive the image data from the transmission device;
　　a second memory on which a physical rate of the second wireless communicator and a communication rate of the image data are recorded; and
　　one or more second processors configured to execute:
　　　　recording processing of recording the sequence number of the image data received by the second wireless communicator on the second memory;
　　　　image output processing of outputting the image data received by the second wireless communicator to a monitor;
　　　　identification processing of identifying a retransmission candidate on the basis of the sequence number recorded on the second memory,
　　　　　　wherein the retransmission candidate indicates image data that have been transmitted by the transmission device and have not been received by the second wireless communicator;
　　　　calculation processing of calculating an upper limit retransmission number on the basis of the physical rate and the communication rate recorded on the second memory,
　　　　　　wherein the upper limit retransmission number indicates an upper limit of the number of pieces of image data of which retransmission has been requested;
　　　　setting processing of setting an allowable retransmission number that is less than or equal to the upper limit retransmission number; and
　　　　retransmission request processing of transmitting a retransmission request for requesting retransmission of as many of the retransmission candidates as the allowable retransmission number to the transmission device by using the second wireless communicator when the number of the retransmission candidates identified through the identification processing exceeds the allowable retransmission number,
wherein the one or more second processors are configured to execute the retransmission request processing in a blanking period, wherein the blanking period is a period from a first timing to a second timing, wherein the first timing comes after transmission of N-th frame data including one or more pieces of image data for the first time is completed, wherein the second timing comes after the first timing and before transmission of (N+1)-th frame data including one or more pieces of image data for the first time is started, wherein N is an integer of one or more, wherein the one or more second processors are configured to execute the retransmission request processing in the blanking period after transmission of K-th frame data including one or more pieces of image data for the first time is completed so as to transmit the retransmission request of M-th frame data including one or more pieces of image data to the transmission device, and wherein M is an integer of one or more and K is an integer that is greater than or equal to (M+1).

6. A non-transitory computer-readable recording medium storing a program causing one or more processors of a reception device including a wireless communicator configured to receive image data that are transmitted by a transmission device and include a sequence number, a memory on which a physical rate of the wireless communicator and a communication rate of the image data are recorded, and the one or more processors to execute:

recording processing of recording the sequence number of the image data received by the wireless communicator on the memory;

image output processing of outputting the image data received by the wireless communicator to a monitor;

identification processing of identifying a retransmission candidate on the basis of the sequence number recorded on the memory, wherein the retransmission candidate indicates image data that have been transmitted by the transmission device and have not been received by the wireless communicator;

calculation processing of calculating an upper limit retransmission number on the basis of the physical rate and the communication rate recorded on the memory, wherein the upper limit retransmission number indicates an upper limit of the number of pieces of image data of which retransmission has been requested;

setting processing of setting an allowable retransmission number that is less than or equal to the upper limit retransmission number; and retransmission request processing of transmitting a retransmission request for requesting retransmission of as many of the retransmission candidates as the allowable retransmission number to the transmission device by using the wireless communicator when the number of the retransmission candidates identified through the identification processing exceeds the allowable retransmission number, wherein the one or more processors execute the retransmission request processing in a blanking period, wherein the blanking period is a period from a first timing to a second timing, wherein the first timing comes after transmission of N-th frame data including one or more pieces of image data for the first time is completed, wherein the second timing comes after the first timing and before transmission of (N+1)-th frame data including one or more pieces of image data for the first time is started, wherein N is an integer of one or more, wherein the one or more processors execute the retransmission request processing in the blanking period after transmission of K-th frame data including one or more pieces of image data for the first time is completed so as to transmit the retransmission request of M-th frame data including one or more pieces of image data to the transmission device, and wherein M is an integer of one or more and K is an integer that is greater than or equal to (M+1).

* * * * *